(No Model.)

D. A. FISKE.
CHURN DASHER.

No. 418,403. Patented Dec. 31, 1889.

WITNESSES:

INVENTOR:
D. A. Fiske
BY Munn &
ATTORNEYS.

UNITED STATES PATENT OFFICE.

DANIEL A. FISKE, OF ST. LOUIS, MISSOURI.

CHURN-DASHER.

SPECIFICATION forming part of Letters Patent No. 418,403, dated December 31, 1889.

Application filed May 8, 1889. Serial No. 310,019. (No model.)

*To all whom it may concern:*

Be it known that I, DANIEL A. FISKE, of St. Louis, State of Missouri, have invented a new and Improved Churn-Dasher, of which the following is a full, clear, and exact description.

Reference is to be had to the accompanying drawings, forming a part of this specification, in which similar letters of reference indicate corresponding parts in all the figures.

Figure 1:
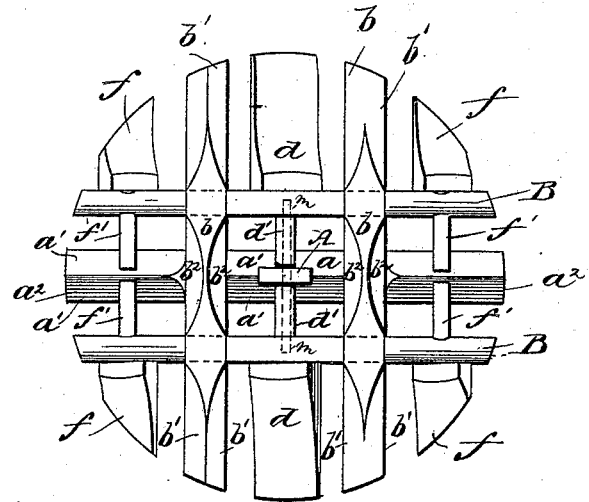
Figure 2:
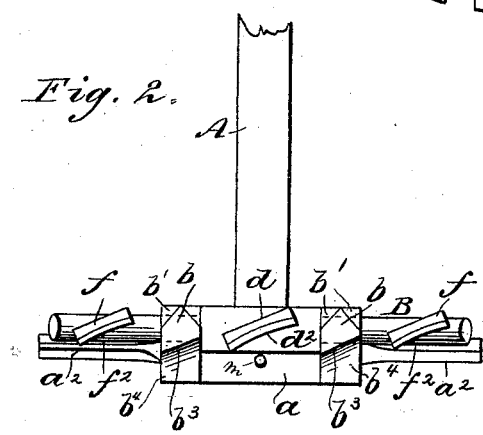
Figure 3:
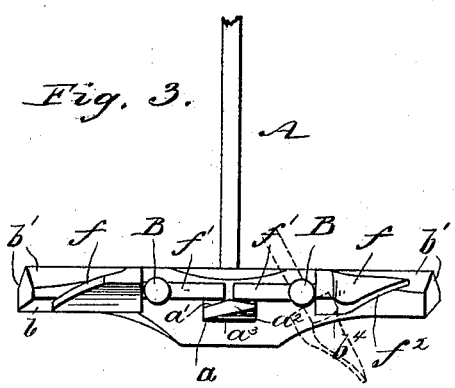

Figure 1 is a plan view of my new and improved churn-dasher, and Figs. 2 and 3 are side elevations of the same.

The invention will first be described in connection with the drawings, and then pointed out in the claims.

The main frame of the dasher is composed of the central bar $a$ and parallel cross-pieces $b\ b$. The staff A of the dasher is mortised into the center of the bar $a$, and the top of this bar is beveled in opposite directions, as shown at $a'\ a'$, and its ends $a^2$ are reduced in thickness and beveled upon the under surface, as shown at $a^3$, to deflect the cream to one side when the dasher is thrust downward. The bars $b$ are each beveled at their upper surfaces, as shown at $b'\ b^2$, at the ends and center, and they are each beveled at the ends upon the under surface, as shown at $b^3$, Fig. 2, and at $b^4$, Fig. 3, so that when the dasher is forced down through the cream the said bars will deflect it outward and to one side.

In the bars $b\ b$ are journaled the two shafts B B, parallel with and equidistant from the central bar $a$. In each of these shafts is secured a central blade $d$ and two end blades $f\ f$. Each of the blades $d$ are formed with a round shank $d'$, which passes through a hole in the shaft quite snugly, so that the blade may be turned for adjusting it to any desired angle. The under surface of the said blades $d$ are concave, as shown at $d^2$, Fig. 2, and they are set at an angle, as shown in said figure, to deflect the cream against the adjacent surface of the bar $b$ as the dasher is forced downward. The ends of the shanks $d'$ reach over the central bar $a$, which acts as a stop to the blades $d$, so that they cannot swing upward beyond a horizontal position or on a plane with the fixed bars $a\ b$. The blades $f$ are each formed with a round shank $f'$ to fit in holes near the end of the shaft B, as shown clearly in Fig. 1, and also to permit the said blades to be turned to any desired angle for deflecting the cream. The shanks $f'$ are of a length to reach over the central bar $a$, so that they serve, together with the shanks $d'$, to cut and agitate the cream that issues between the shafts B B and the central bar $a$. The under surface of each of the blades $f$ is made concave, as shown at $f^2$, to cause them to more effectively agitate the cream, and the outer ends of all of the blades $f$ and $d$ and the ends of bars $a\ b$ and shafts B B are curved, all being struck from the center of the dasher, so that the dasher is circular in outline.

When the churn-dasher is lifted up through the cream, the blades $d\ f$ turn the shafts B, so that said blades droop to the position shown in dotted lines in Fig. 3, and this downward deflection of the said blades is limited by the pin $m$ inserted in the center of the central bar $a$, against the ends of which the blades $d$ strike when turned downward, as will be understood from Figs. 1 and 2.

While I have shown my new dasher constructed for a round churn-body, it will be understood that it may be made square to adapt it to churns of that form.

Having thus described my invention, what I claim as new, and desire to secure by Letters Patent, is—

1. As a new article of manufacture, a churn-dasher composed of the central bar $a$ and two parallel bars $b\ b$ at right angles to the said central bar, in combination with the two shafts B B, journaled in the cross-bars $b\ b$, and provided with blades $d\ d$, between the cross-bars $b\ b$ and blades $f$, outside the said cross-bars, the blades being formed with shanks to strike upon the central bar, substantially as described.

2. The central bar $a$ and the two parallel bars $b\ b$ at right angles to the said central bar, and the two shafts B B, journaled in the said bars $b\ b$, in combination with the blades $f\ d$, adjustably held in the said shafts and made concave upon their under surfaces, substantially as described.

DANIEL A. FISKE.

Witnesses:
J. J. C. GILLESPIE,
FERDINAND MUELLER.